Figure 6:
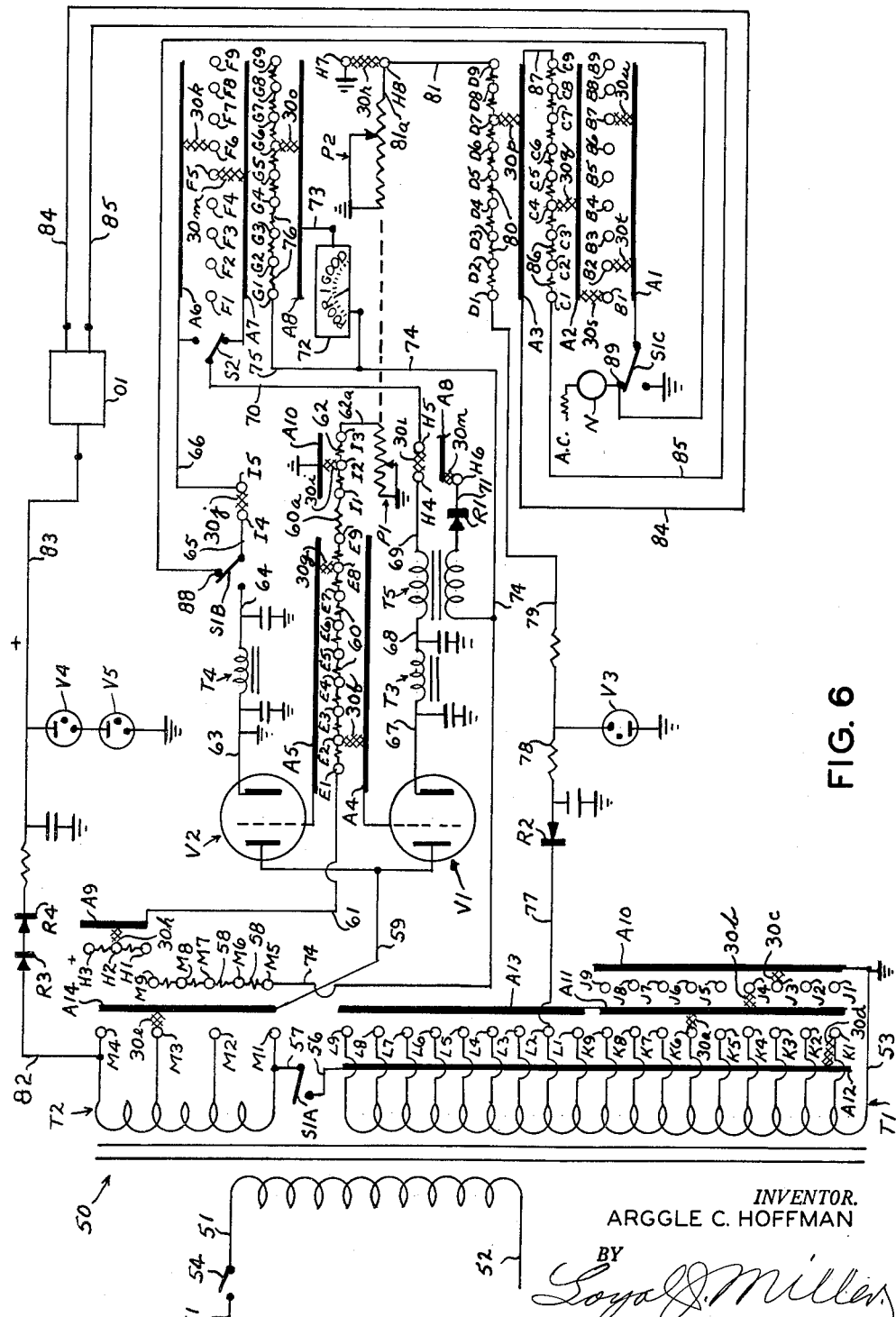

April 3, 1962
A. C. HOFFMAN
3,028,545
TUBE TESTER
Filed March 11, 1959
2 Sheets-Sheet 1
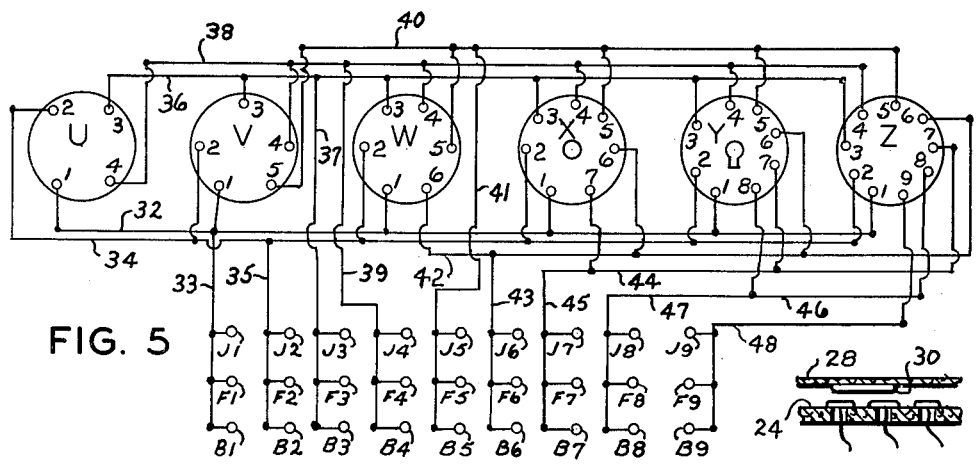
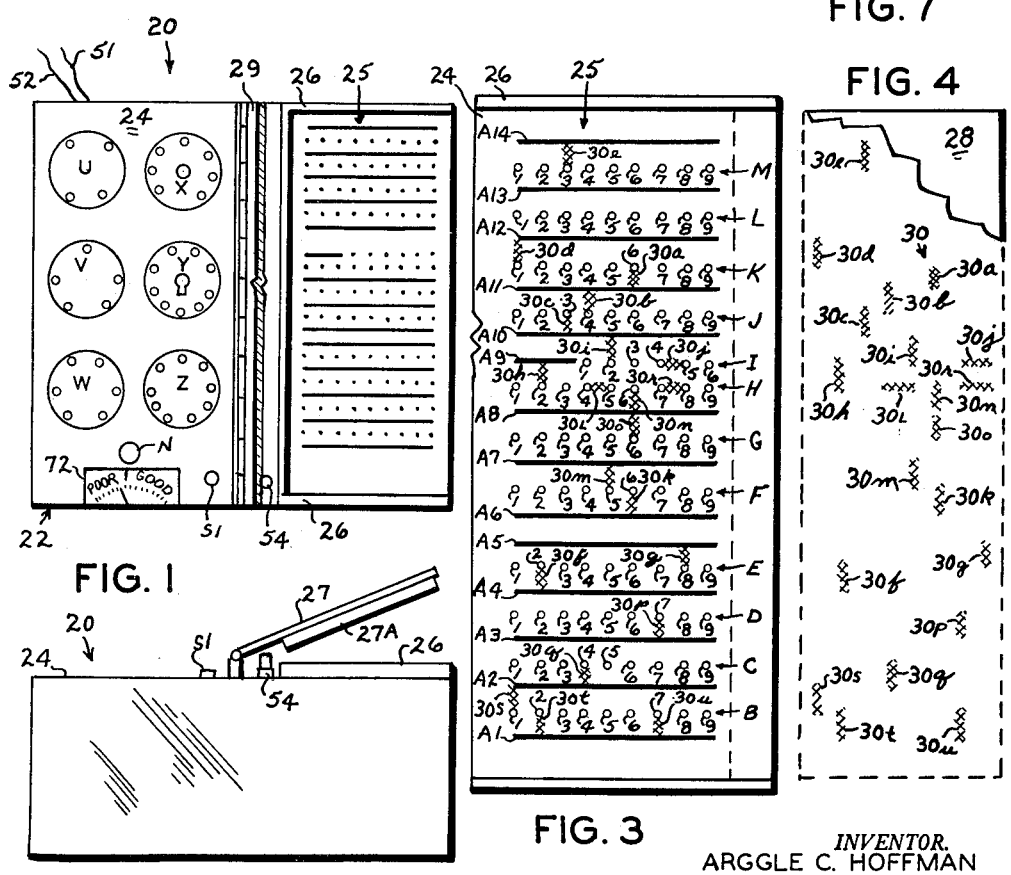
INVENTOR.
ARGGLE C. HOFFMAN
BY Loyal J. Miller
ATTORNEY April 3, 1962 A. C. HOFFMAN 3,028,545
TUBE TESTER
Filed March 11, 1959 2 Sheets-Sheet 2

INVENTOR.
ARGGLE C. HOFFMAN
BY
Loyal J. Miller
ATTORNEY

United States Patent Office 3,028,545
Patented Apr. 3, 1962

3,028,545
TUBE TESTER
Arggle C. Hoffman, 2936 SW. 50th, Oklahoma City, Okla.
Filed Mar. 11, 1959, Ser. No. 798,636
2 Claims. (Cl. 324—22)

The present invention relates to tube testers and is designed primarily for testing tubes used in radios and the like.

There are, on the market, a large number of types of such tubes which differ, one from the other, in the number of elements contained therein and in the connections between the elements and the contact terminals or prongs of the tubes. For the most part these tubes are divided into a small number of groups with tubes of each group having the same number of prongs in the same arrangement so that any tube of a given group may be inserted in a socket designed for tubes having a certain number of prongs. However, tubes of the same group differ, one from the other, in the character of the elements contained therein or in the order of the connection with the prongs or both and each particular tube requires different circuit connections for properly testing the same. Thus, it may be seen that while a vast number of tubes may be checked in a relatively few sockets the number of possible circuit connections is large and that the connections serving a particular tube must be accurately selected and established in accordance with the requirements of the particular tube to be tested. It is customary in most tube testing devices to manually select the circuit connections and this frequently results in error of either the circuit selection or in applying a current to the element of the tube which will materially damage the function thereof. This results in a signal appearing in the testing machine, which is meaningless, and results, in many cases, in the ruination of the tube under test. Furthermore, such a manner of testing is a tedious and time consuming operation since each tube frequently requires two or more tests.

It is, therefore, the principal object of the instant invention to provide a tube tester by which inexperienced persons may check their own tubes.

Another important object is to provide an electrical circuit combination for each particular tube which comprises circuit contact connections or jumpers printed on individual cards for completing a tube testing circuit.

Another object is to provide an electrical circuit which is relatively simple in design and which will insure proper circuit connections being made for the particular tube under test.

An additional object is to provide a device of this character wherein the tube under test will not be damaged in any way by the use of a jumper equipped card intended for a different tube or type of tube.

Another object is to provide a tube tester wherein all the circuit connections necessary for a particular tube are effected simultaneously.

An additional object is to provide a device wherein a single jumper equipped card provides the connections between the elements of the tube for effecting a different test in successive operations.

A further object is to provide a device wherein the jumper equipped cards may be imprinted on both sides for testing different tubes thereby reducing the number of cards necessary.

The present invention accomplishes these and other objects by providing a substantially rectangular housing having a plurality of sockets each containing a different number of prongs for receiving various tubes to be tested. A bank of contact bars and points are connected with a source of electrical energy through a transformer by electrical conductors. A means carried by the upper surface of the device adjacent the sockets accurately positions a jumper printed card on the bank of contact bars and points while simultaneously closing a current supplying switch. A meter and neon bulb, carried by the device, visually records the condition of the tube under test.

Other objects will be apparent from the following description when taken in conjunction with the accompanying two sheets of drawings, wherein:

FIGURE 1 is a top plan view of the device;
FIGURE 2 is a front elevational end view;
FIGURE 3 is a plan view of the bank of contact bars and points;
FIGURE 4 is a plan view of one of the cards illustrating the position of jumpers printed thereon for a particular tube;
FIGURE 5 is a wiring diagram illustrating the connection between the prongs of the tube testing sockets and certain ones of the contact points;
FIGURE 6 is a wiring diagram of the electrical circuit; and
FIGURE 7 is a fragmentary vertical cross-sectional view, through the bank of contact bars and points, and illustrating the relative position of one jumper of the card therewith.

Like characters of reference designate like parts in those FIGURES of the drawings in which they occur.

In the drawings:

The reference numeral 20 indicates as a whole, a preferred embodiment of my invention comprising a substantially rectangular housing 22 having a horizontally disposed upper surface or top 24. One side of the housing top 24 is provided with the desired number of different sockets for receiving the tubes to be tested and in the example shown includes six sockets, U, V, W, X, Y and Z, each having a different number of terminals. Referring to FIG. 5 it may be seen that these terminals are numbered in the same order, as 1 to 4 in socket U, and each succeeding socket has one more terminal than the preceding socket. Each of these sockets is adapted to receive any standard type of tube having a number of prongs corresponding to the number of terminals in the socket. The numbering of the terminals of the sockets is to indicate their order and not necessarily the character of the tube elements, since the elements connected with the respective terminals of any socket will vary in different types of tubes.

The opposite side of the upper surface 24 of the device is equipped with a bank of contacts indicated generally at 25 and comprises a series of parallel contact bars numbered A1 to A14 and a series of parallel rows of contact points, comprising nine points to each row, lettered B through M and disposed between the respective pairs of bars (FIG. 3). The terminals of the sockets are each connected to the bank of contacts 25 in a manner hereinafter set forth in more detail. Each of the bars A1 through A14, together with selected ones of the points of the rows of points, form terminal ends of circuits connected with the terminals of the tube testing sockets in a manner more fully explained hereinbelow. The bank of contacts 25 is surrounded on three sides by a relatively low upstanding wall 26 which forms a holder for accurately positioning any one of a series of cards 28. The card 28 is provided with a series of conductive bars or jumpers 30 printed, bonded or otherwise secured to one surface of the card in predetermined positions for bridging the spacing between selected terminal points and bars to complete a tube testing circuit (FIGS. 4 and 7). A lid 27 hingedly connected to the housing adjacent the bank of contacts, as at 29, provides a means of insuring contact of the jumpers 30 with the contacts 25. A sponge rubber pad 27A is secured to the under side of the lid 27 for evenly distributing pressure applied to the card when the lid is closed.

FIG. 3 illustrates, in plan view, a preferred arrangement of the bank of contacts 25 wherein the series of contact bars numbered A1 through A14 are disposed in parallel spaced relation. Parallel rows of contact points numbered B1 to B9; C1 to C9; D1 to D9; E1 to E9; F1 to F9; G1 to G9; H1 to H9; I1 to I6; J1 to J9; K1 to K9; L1 to L9; and M1 to M9 are positioned between respective pairs of the bars with the exception of the points I1 to I6 which form a continuation of the short bar A9 as shown.

FIG. 5 diagrammatically illustrates the manner of connecting the respective terminals of the tube testing sockets to the rows of points B, F and J. Terminal 1 of each socket is connected with a conductor 32 which is in turn connected by a conductor 33 to the points B1, F1 and J1. The terminal 2 of each socket is connected with a conductor 34 which is in turn connected by a conductor 35 to the points B2, F2 and J2. The terminal 3 of each socket is connected with a conductor 36 which is in turn connected by a conductor 37 to the points B3, F3, and J3. The terminal 4 of each socket is connected with a conductor 38 which is in turn connected with the points B4, F4 and J4 by a conductor 39. The terminals 5 of sockets V to Z, inclusive, are connected through conductors 40 and 41 to the points B5, F5 and J5. The terminals 6 of sockets W to Z, inclusive, are connected through conductors 42 and 43 to the points B6, F6 and J6. The terminals 7 of sockets X, Y and Z are connected through conductors 44 and 45 to the points B7, F7 and J7. The terminals 8 of sockets Y and Z are connected through conductors 46 and 47 to the points B8, F8 and J8 while the terminal 9 of socket Z is connected to the points B9, F9 and J9 by a conductor 48.

The current necessary for the operation of the tester 20 may be derived from any suitable source and in the example shown includes a transformer 50 having the primary winding connected across the conductors 51 and 52 of a current supply line, usually a 110 volt line. The transformer 50 includes two secondary windings T1 and T2. The secondary winding T1 is provided with nineteen leads for providing a like number of voltages of different values. The first lead 53 of the secondary T1 is connected to the bar A10 and to ground while the next nine leads of the secondary T1 are connected in individual sequence to the points K1 to K9, respectively, and the remaining nine leads of this secondary are similarly connected, respectively, to the points L1 to L9.

The secondary winding T2 of transformer 50 is provided with four leads of selected voltage which are connected, respectively, to the points M1, M2, M3 and M4. A switch 54 interposed in the current line 51 turns the current on when testing a tube in a manner more fully disclosed hereinbelow. Any of the eighteen voltages from the secondary T1 of transformer 50 may be selected and applied to the filament of a tube under test with a jumper between contact bar A11 to any one contact point of the row of points K1 to K9 or from contact bar A13, which is connected with bar A11, to any one contact point of the row of points L1 to L9. This voltage may then be conveyed to any pin of the tube under test with a jumper from A11 to any one point of the row of points J1 to J9 and the respective conductor connected to the respective pin as disclosed hereinabove. To complete the circuit a jumper may be connected between contact bar A10 and to any one point of the row of points J1 to J9. Any one of these eighteen voltages of the secondary T1 may be connected to the bar A12 by a jumper. Bar A12 is connected to the contact point M1 by conductors 56 and 57 through a switch S1A. The voltage from bar A12 may be jumped directly from point M1 to bar A14, or a voltage that is in series and phase with it, from the secondary winding T2 of transformer 50, may be jumped from the contact point M2, M3, or M4 to the bar A14. The alternating current voltage from bar A14 may be jumped to any one point of the remaining points of the row of points M5 to M9 for checking rectifier tubes. These points M5 to M9 are connected in series by resistors 58.

The voltage from A14 is connected to the plates of a pair of grid controlled rectifiers V1 and V2 by a conductor 59. The bias on rectifier V1 determines the plate voltage for the tube under test and may be selected by a jumper from bar A4 to any one point of the row of points E1 to E9. The points E1 to E9 are connected together in series by resistors 60. The point E9 is connected to the point I1 by a resistor 60a while a pair of resistors 62 connect the points I1, I2 and I3 in series. The point I3 is connected to a potentiometer P1 by a conductor 62a.

The bias on rectifier V2 for the screen grid is selected by a jumper from bar A5 to any one point of the row of points E1 to E9. The bias range is selected by a jumper from a selected one of the points H1, H2, or H3 to bar A9, which is connected to the point E1 by a conductor 61, and by a jumper from a selected one of the points I1, I2, or I3 to bar A10.

The screen voltage is applied to the selected pin of the tube under test from a filter choke T4, connected with the rectifier V2 by a conductor 63, through a conductor 64, a switch S1B and a conductor 65 to the point I4. This voltage is then jumped to the point I5, which is in turn connected to the bar A6 by a conductor 66, and then jumped from bar A6 to any one point of the row of points F1 to F9.

A filter choke T3 is connected to the rectifier V1 by a conductor 67 which is in turn connected by a conductor 68 to the primary winding of a transformer T5. The output of the primary winding of transformer T5 is connected by a conductor 69 to the point H4. The plate voltage may then be connected by a jumper from point H4 to point H5 which is connected with the bar A7 through switch S2 by a conductor 70. Bar A7 may be connected by a jumper to any one point of the row of points F1 to F9. A rectifier R1 is connected with the secondary of transformer T5 and the rectified signal voltage from the plate of the tube under test is connected by a conductor 71 to the point H6. A jumper may then be used to connect the point H6 to the bar A8. One terminal of a meter 72 is connected with the bar A8 by a conductor 73. The other terminal of the meter 72 is connected with the secondary winding of transformer T5 and the point M5 by a conductor 74. A conductor 75 connected with the meter 72 and the point G1 shunts a portion of the current around the meter. The points G1 to G9 are connected in series by resistors 76. The meter 72 is preferably provided with a dual type dial calibrated in increments for determining the value of the tube under test and divided in ranges indicating a tube of "poor" or "good" quality for the benefit of persons untrained in the art of tube testing. The face of the meter is preferably located on the upper surface 24 of the housing where it may be easily seen by the operator (FIG. 1). The current range of the meter 72 may be selected by a jumper from bar A8 to any one point of the row of points G1 to G7.

A rectifier R2 is connected by a conductor 77 to one of the leads of transformer secondary T1, which are connected with the row of points L1 to L9, the particular lead being determined by the voltage required for the regulator tube V3. The output of the rectifier R2 is connected through a resistor 78 to a gas filled regulator tube V3 which is in turn connected to ground. The rectified current from the rectifier R2 and tube V3 is connected by a conductor 79 to the point D1 through a suitable resistor. The row of points D1 to D9 are connected in series by resistors 80 while the point D9 is connected by a conductor 81 to the point H8. A conductor 81a connects point H8 with a potentiometer P2 coupled with potentiometer P1 for varying the grid voltage in checking grid controlled arc tubes. The grid bias voltage of the tube under test may then be connected by a jumper from any one point of the row of points D1 to D9 to the bar A3. A pair of rectifiers R3 and R4 are connected in series by a conductor 82 to the lead of transformer secondary T2, connected to the point M4. The rectified positive signal from the rectifiers R3 and R4 is connected to a pair of regulator tubes V4 and V5, connected in series to ground, through a suitable resistor to an audio oscillator O1 by a conductor 83. The output terminals of the oscillator O1 are connected to the contact bar A3 and the point C1, respectively. The row of points C1 to C9 are connected in series by resistors 86 and the point C9 is connected to the bar A3 by a conductor 87. The value of the signal applied to the bar A3 and the point C1 from the oscillator O1 is determined by the placement of a jumper between one of the points C1 to C9 and the bar A2. Grid bias plus signal voltage is connected to the tube under test by a jumper from the bar A2 to a selected one of the points of the row of points B1 to B9.

The cathode of the tube under test is connected to the bar A1 with a jumper from the proper one of the points B1 to B9. The suppressor grid of the tube under test is similarly connected to the bar A1.

A switch S1C is connected to the bar A1. The three switches indicated by S1A, S1B and S1C are all parts of a conventional three prong switch S1 (FIG. 1) and are diagrammatically shown separately for clarity. The terminal 88 of the switch S1B is connected with the terminal 89 of the switch S1C. The switch S1C connects the cathode and suppressor grid of the tube under test to one end terminal of a neon bulb N for a shorts test voltage. The opposite end terminal of the bulb N is connected to an alternating current source. Thus, when the switch S1C is moved from its terminal contact 89 to ground the neon bulb will be excited if a short exists in the tube under test.

*Operation*

The operation of the instant tube tester will be best understood with a description of the test of a particular tube, for example, a pentode tube, not shown, but which is received by the socket X wherein pin 1 is the grid; pin 2 is the cathode; pins 3 and 4 are the heaters; pin 5 is the plate; pin 6 is the screen grid; and pin 7 is the suppressor grid. Thus the terminals 1 to 7 of the socket X are connected respectively to the respective points 1 to 7 of the rows of points B, F and J as described hereinabove. The jumpers 30, shown on the card illustrated in FIG. 4, are positioned thereon to properly connect the desired points and bars of the bank of contacts 25 for this particular tube. These respective positions of the jumpers 30, on the card 28 and on the respective diagrams when the card is placed in contact with the bank of contacts 25, are each illustrated for clarity by a series of diagonal crossed lines.

A voltage is selected for the heater or filament circuit with a jumper 30a from contact bar A11 to point K6 connected with a lead of the transformer secondary T1. This voltage is then placed on the heater filament pin 4 by a jumper 30b from bar A11 to point J4 and to complete the circuit a jumper 30c connects bar A10 to point J3. A jumper 30d connects a selected voltage from the transformer secondary T1 lead connected with the point K1 to the bar A12. When the push-to-test switch S1A is closed this voltage passes to the point M1 and through the transformer secondary T2 to the bar A14 by a jumper 30e connecting the point M3 with the bar A14. The bias voltage for rectifier V1, carried by the bar A4 is connected to the point E2 by a jumper 30f. The bias voltage for the rectifier V2, carried by the bar A5 is connected with the point E8 by a jumper 30g. A jumper 30h connects the bar A9 to the point H2 and a jumper 30i connects the bar A10 with the point I2. The screen voltage from filter choke T4 passes through switch S1B, when closed, to point I4 and is jumped to the point I5 by a jumper 30j. A jumper 30k connects bar A6 with the point F6. The plate voltage from transformer T5 connected to point H4 is jumped to the point H5 by a jumper 30L. From switch S2 and bar A7 the plate voltage is connected to the point F5 by a jumper 30m. A jumper 30n connects the rectified signal voltage from the transformer T5 and point H6 to the bar A8. The current range of the meter 72 is determined by a jumper 30o between the bar A8 and the point G6. A jumper 30p connects the grid bias voltage from the point D7 to the bar A3 while the signal current is connected from point C4 to the bar A2 by a jumper 30q and a jumper 30r connects H8 and H7. The bias plus signal current is connected from bar A2 to the point B1 by a jumper 30s. The jumpers 30t and 30u connect the cathode and suppressor grid to the bar A1 from the points B2 and B7, respectively.

Obviously other combinations or arrangement of the jumpers 30 must be effected on other cards for checking tubes of different groups or types.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A tube tester, including: a rectangular housing having a plurality of sockets in its upper surface, said sockets each having a plurality of terminals adapted to receive a tube to be tested; an upstanding wall carried by the upper surface of said housing; a lid hingedly connected to the upper surface of said housing adjacent said wall and adapted for vertical swinging movement toward and away from the area enclosed by said wall; a transformer carried by said housing and connected with a single source of A.C. electrical energy; a tube condition indicator carried by said housing; normally open circuit means having bar-type terminal ends exposed on the upper surface of said housing in parallel spaced-apart relation within the area enclosed by said wall; a normally open switch interposed between said transformer and the source of electrical energy, said normally open switch closed by moving said lid to a closed position; wiring connecting a plurality of said bar-type terminal ends with a like plurality of selected voltages of said transformer, said normally open circuit means having other spaced-apart point-type terminal ends exposed in parallel rows between said bar-type terminal ends; closed circuit means connecting the terminals of said sockets with a plurality of said point-type terminal ends, said closed circuit means connecting a plurality of said point-type terminal ends with a like plurality of selected voltages of said transformer; a control card adapted to be positioned on the upper surface of said housing adjacent said wall; and relatively short electrical conductive elements secured in spaced-apart non-overlapping relation to one side of said control card in a predetermined pattern for completing a selected circuit between said bar-type and point-type terminal ends and said indicator when said normally open switch is closed and said lid is pivoted downward to overlie said control card.

2. A tube tester, including: a rectangular housing having a plurality of sockets in its upper surface, said sockets each having a plurality of terminals adapted to receive a tube to be tested; an upstanding wall carried by the upper surface of said housing and enclosing an area of selected size; a lid of a size substantially equal to the area enclosed by said wall, said lid being hingedly connected to the upper surface of said housing adjacent said wall for vertical swinging movement toward and away from the upper surface of the housing enclosed area; a transformer carried by said housing and connected with a source of A.C. electrical energy; a normally open switch interposed between said transformer and the source of electrical energy and closed by movement of said lid toward the wall enclosed area of said housing; tube condition indicator means carried by said housing; normally open circuit means carried by said housing and having bar-type terminal ends exposed in parallel spaced-apart relation and having a plurality of point contact spaced-apart terminal ends exposed in rows between said bar-type terminal ends on the upper surface of said housing within the area enclosed by said wall; first closed circuit means connecting selected voltages supplied by said transformer with a plurality of said bar-type terminals of said normally open circuit means; second closed circuit means connecting the terminals of said sockets with a plurality of said point contact terminal ends of said normally open circuit means; a control card adapted to be positioned on the upper surface of said housing within the area enclosed by said wall; and relatively short electrical conductive elements secured in spaced-apart non-overlapping relation to one side of said control card in a predetermined pattern for completing circuits between said bar-type and point contact terminal ends and said indicator when said lid is pivoted downward to overlie said control card.

References Cited in the file of this patent
UNITED STATES PATENTS 2,870,400    Hickok _____ Jan. 20, 1959

FOREIGN PATENTS 709,317    Germany _____ Aug. 13, 1941
424,714    Italy _____ Aug. 28, 1947